United States Patent
Janay et al.

[11] Patent Number: 5,831,608
[45] Date of Patent: *Nov. 3, 1998

[54] USER INTERFACE FOR A REMOTE TERMINAL

[75] Inventors: Gad Janay, Boca Raton, Fla.; Todd Yompel, Brooklyn, N.Y.

[73] Assignee: Advanced Transition Technologies, Inc., New York, N.Y.

[*] Notice: The term of this patent shall not extend beyond the expiration date of Pat. No. 5,530,961.

[21] Appl. No.: 594,015

[22] Filed: Mar. 30, 1996

Related U.S. Application Data

[63] Continuation-in-part of Ser. No. 231,373, Apr. 21, 1994, Pat. No. 5,530,961.

[51] Int. Cl.⁶ ...................................................... G06F 3/14
[52] U.S. Cl. ............................................................ 345/334
[58] Field of Search .................................. 395/766–769, 395/333–335; 345/334

[56] References Cited

U.S. PATENT DOCUMENTS

| | | | |
|---|---|---|---|
| 5,045,994 | 9/1991 | Belfer et al. | 395/500 |
| 5,179,700 | 1/1993 | Aihara et al. | 345/326 |
| 5,502,839 | 3/1996 | Kolnick | 395/500 |

OTHER PUBLICATIONS

Novell, Xtrieve Manual, pp. 7–1 to 7–10, 10–1 and 10–2, Oct. 1988.

*Primary Examiner*—Anton Fetting
*Attorney, Agent, or Firm*—Jeffrey Kaplan

[57] ABSTRACT

An enhanced user interface for a remote terminal which include a technique of allowing users to define the order in which data is entered, define what particular function keys represent, and to display certain fields in a customize manner.

1 Claim, 4 Drawing Sheets

TRANSACTION RECORD

301 — FIRST NAME _____
302 — LAST NAME _____

PHONE _____

ADDRESS _____

ACCT NO. _____

ORDER NO. _____

*FIG. 3*

TRANSACTION RECORD

301 — FIRST NAME _____ ①
302 — LAST NAME _____ ②

PHONE _____ ③

ADDRESS _____ ④

ACCT NO. _____ ⑤

ORDER NO. _____ ⑥

*FIG. 4*

USER INTERFACE FOR A REMOTE TERMINAL

RELATED APPLICATION

This application is a continuation-in-part of application Ser. No. 08/231,373, filed Apr. 21, 1994, now U.S. Pat. No. 5,530,961.

TECHNICAL FIELD

This invention relates to computer networks, and more particularly, to an improved user interface preferably for use in connection-with a personal computer (e.g.; local terminal) or the like while connected to a remote computer.

BACKGROUND OF THE INVENTION

Remote terminals have been in widespread use for many years. Recently, with the move towards distributed computing, it has been more and more common to utilize a remote computer from a local terminal by accessing the remote computer over a data network. The terminal, in many cases, is actually a personal computer which is programmed in such a manner as to communicate with the remote computer. Many times, the PC is programmed to emulate a terminal so that the remote computer can not distinguish it from a simple "dumb" terminal.

One issue to be addressed by a designer of such systems is that the users of such a terminal often desire to customize the user interface in a manner which is different from the user interface provided by the remote computer. Different users may wish to see different user interfaces, and the user interfaces desired by a particular user may also change based upon the particular application program running on the remote computer.

The user interface, as defined herein, may include one or more display and input/output features. For example, the order in which fields of a database are displayed, the order in which they are accessed for data input, the definition and function of "PF" keys, the names given to each field, or other parameters utilized by the terminal user are all attributes which different users desire to configure differently.

Prior art systems for resolving some of the above issues exist, but contain numerous drawbacks. For example, one such system is described in U.S. Pat. No. 5,179,700, issued to Aihara. In the Aihara arrangement, each time the remote computer downloads a screen full of information to be displayed on the user terminal, it includes a screen ("ID") identification. The screen ID is a few bits of information which identifies the type of screen being downloaded. The screen ID is read by the local terminal and a table look up is performed based upon the screen ID, in order to determine the particular user interface which should be displayed to the user. The arrangement has several drawbacks.

First, if the application at the remote computer is modified, but the screen ID is not changed, the local terminal will misinterpret the screen information and display incorrect and/or meaningless data. Additionally, the particular user interface parameters which define the manner in which information is displayed are globally defined. Specifically, as explained at column 4 of Aihara, the screen ID dictates uniquely the display on the local terminal. Thus, if two users desire a different display for the same screen ID, the local terminal will have to be reprogrammed each time one of the two users accesses the remote computer from the local terminal.

In view of the above, there exists a need for a more flexible and configurable local user terminal.

SUMMARY OF THE INVENTION

The above and other problems of the prior art are overcome in accordance with present invention which relates to a configurable local terminal. In accordance with the invention, numerous features, such as function keys, tabbing orders, field/screen layouts etc., are (i) received from a remote computer, and (ii) translated by the local terminal to allow for specific user interface parameters. The particular user interface parameters may be a function of the particular screen downloaded, and the particular user logging onto the remote computer, as well as of the particular terminal address utilized to log on.

There is provided a software interface to allow each user to customize the particular user interface, for each particular screen. The software interface may be menu driven for added user friendliness.

The invention allows each user to customize each user interface parameter based upon his own personal preference and the particular terminal used, without affecting the user interface parameters to the other users.

BRIEF DESCRIPTION OF THE DRAWINGS

FIG. 3 and 4 show an exemplary screen layout.

DETAILED DESCRIPTION OF THE DRAWINGS

Figure 1:
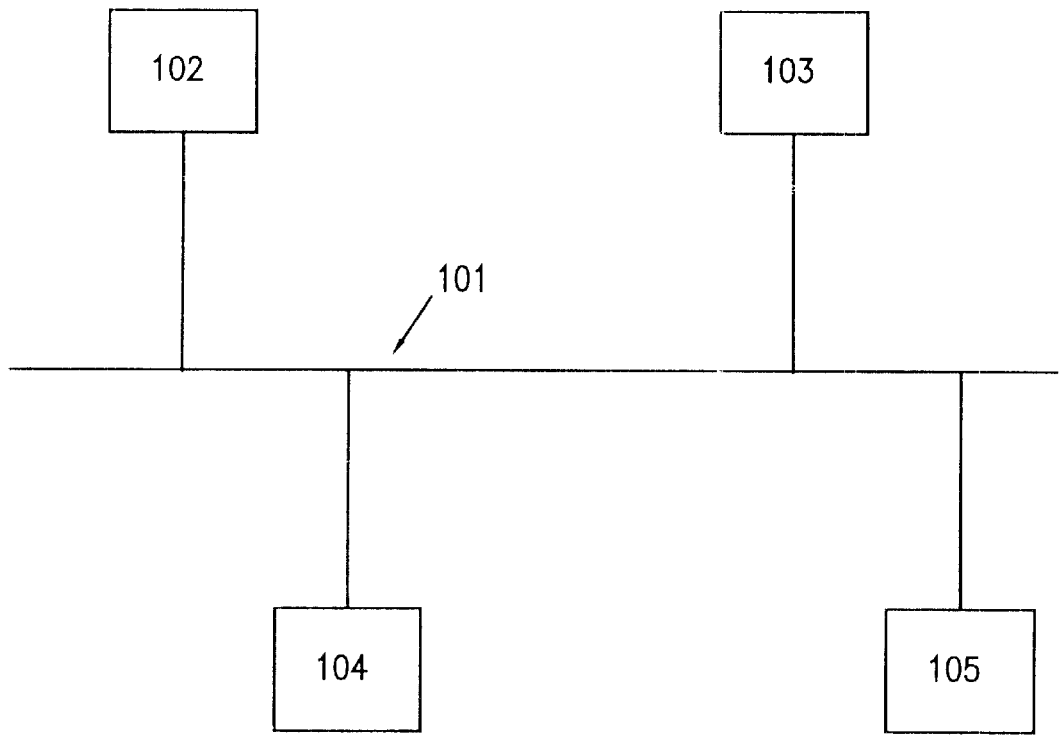
FIG. 1 is a depiction of a small portion of an exemplary computer network.

FIG. 1 shows a local area network 101 with a plurality of computers 102 through 105 connected thereto. The network 101 may be, for example, an Ethernet, or any other suitable local or wide area network.

Computer 102 is designated as a remote host which runs applications software that is accessible from any of local terminals 103 to 105, which may be implemented as personal computers programmed to emulate terminals.

Computers 102–105 may exchange data in any conventional fashion. The communications protocols and standards for use with such networks are quite easily implemented and well known to those of ordinary skill in the art.

Figure 2:
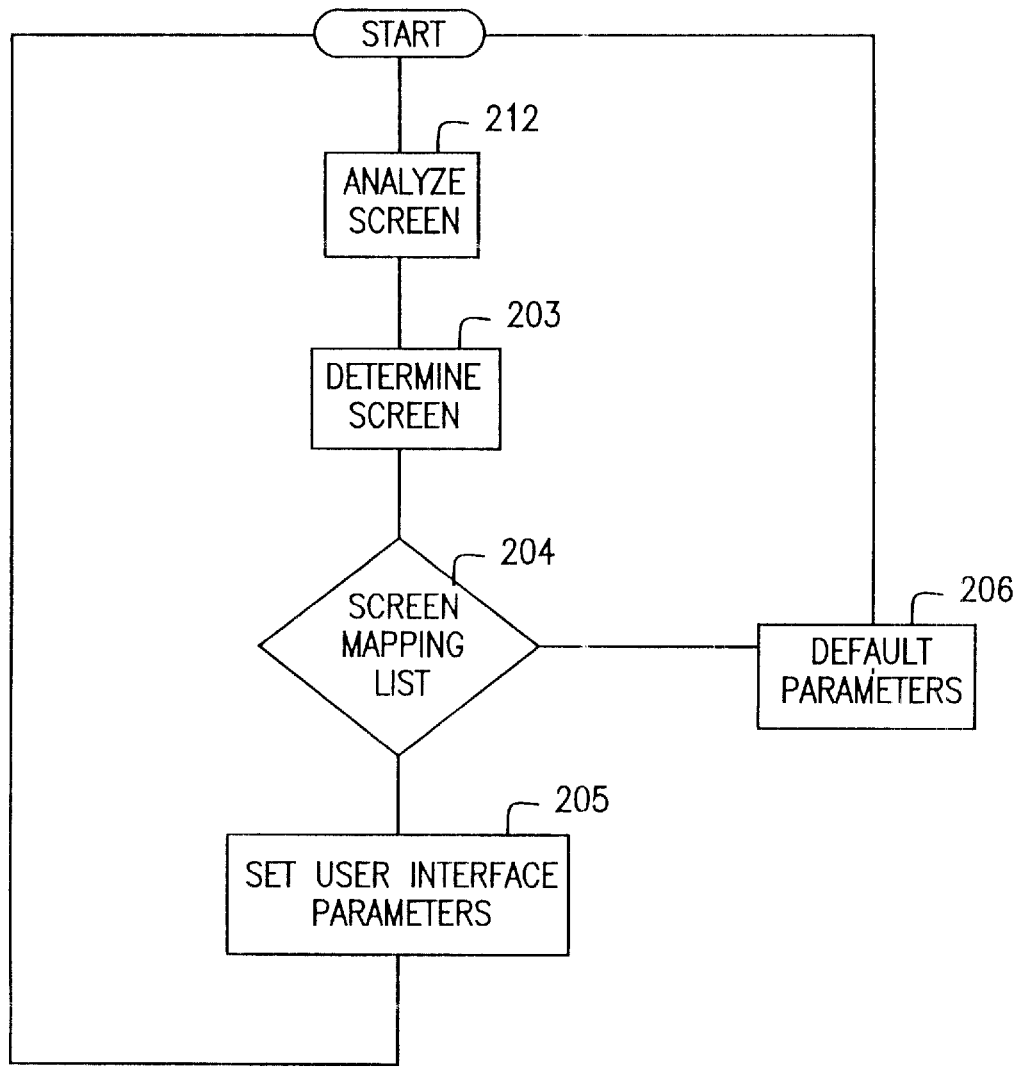
FIG. 2 shows a flow chart of the steps to be implemented by a local terminal in order to practice an exemplary embodiment of the present invention.

FIG. 2 shows a flow chart of the appropriate steps to be implemented by a local terminal in order to practice the inventive technique. The software to implement the flow chart of FIG. 2 should preferably be executed by one of personal computers 103 to 105.

Upon a screen of information being downloaded to a personal computer 103, the personal computer analyzes the screen with respect to the location of particular fields, and other attributes thereof, in order to recognize the particular screen downloaded. A technique for performing such analyses is described fully in copending application Ser. No. 08/231,373, which is commonly assigned with the present application and which is incorporated herein by reference.

At step 203, a table look up is performed which determines the appropriate user interface parameters for a particular screen, which are stored on the computer's hard disk.

If display parameters for this particular screen have been previously stored, then a screen mapping will exist, and decision block 204 will transfer control to block 205 where the previously stored user interface parameters will be invoked before control is returned to start 201 to await the arrival of the next screen of information. If, on the other hand, no previously stored user interface parameters exist for the particular screen recognized by the analysis of step 203, then control is transferred to block 206, where the screen is displayed utilizing default parameters which arrive with the screen of information.

The particular display of the screen, based upon the incoming screen information, may be set up in advance by a user in accordance with techniques known in the art. For example, U.S. Pat. No. 5,179,700 to Aihara discloses a technique for displaying screens of information in a different form from that received by a personal computer.

FIG. 3 shows an example screen for a particular type of data record to be entered. The exemplary screen of FIG. 3 is entitled "Transaction Record" and includes 5 fields of data as shown. The drawing of FIG. 3 is intended to represent the actual display of a screen after it is recognized by the local terminal emulator and displayed on the PC, as previously described therein.

While numerous features concerning the layout of the display of FIG. 3 are described in copending application Ser. No. 08/231,373, there are three additional features which are important to a local user. First, we note that fields 301 and 302 are indicated as "first name" and "last name." These fields may actually arrive as one field, called "name," when downloaded from the remote computer. In accordance with the techniques previously described herein, the single field, after the screen is recognized by the local terminal emulator, is dissected into two fields which provide more convenient display for the end user.

The user may program which field should be broken into simpler fields utilizing any conventional technique for data input, such as a menu. For example, the user could identify the particular field being downloaded by indicating its position and length in the screen, and then could indicate the starting position for each of the new fields on the resulting display. For example, if the "name" field is a 100 byte field where the first 50 bytes represent the first name, and the last 50 bytes represent the last name, the user could specify the location of the field "name" and then specify that the first 50 bytes are to be a first field, displayed locally, and the second 50 bytes are to be a second field. The terminal emulator can prompt the local user, during setup, for particular field names for the new fields into which the field "name" is dissected. Thus, data can be input and/or displayed in "subparts" which may be more meaningful and convenient to the remote user. Location and other characteristics of the display of the "subparts" can then be defined.

In another feature of the present invention, the user can define the tabbing order between fields. Specifically, by depressing a particular function key, a numeral will appear after each field. An example of this with regard to the display of FIG. 3 is shown in FIG. 4. Thus, the numerals 1 through 6, as shown in FIG. 4, are displayed, when the arrangement is in setup mode. The user can then change the numbers to indicate the order in which data is to be entered. For example, the user could interchange the numbers 3 and 5 so that the account number is entered third rather than the phone number. After completing setup mode, the changes are saved and are utilized by the system to dictate the order in which data is inserted later. Specifically, when the system is in its normal data input mode, and data is to be entered into the record displayed in FIG. 3, the cursor will proceed from one field to the next in the order dictated by the arrangement shown in FIG. 4.

The order shown in FIG. 4 can be different for different users and different transaction records. Thus, if a particular operator desires to enter data into a particular transaction in a first order, and a different operator desires to enter data into the fields of the same transaction in a different order, no reprogramming is required. Rather, when the user logs on, the local terminal Identifies the user and uses the order specified by that particular user for a particular transaction record, after it is recognized during downloading from the remote computer in accordance with the techniques previously described.

Features other than tabbing order can also vary based upon particular screens recognized and particular users utilizing such screens. For example, the functions performed by particular "PF" keys, specialized function keys present on most PCs, can vary based upon these factors. Other variations are possible as well.

The above describes the preferred embodiment of the present invention but various modifications and/or additions are intended to be covered by the following claims.

What is claimed is:

1. Apparatus for implementing a computer terminal to be connected to a remote computer, said apparatus comprising:

means for identifying a particular user logged on to said remote computer through said computer terminal;

means for identifying, based upon a position. length and type of each of a plurality of fields, a particular screen to be displayed to said user; and a plurality of special function keys, each key performing a specified function, the specified function performed by each key being determined by the particular user logged on and the particular screen identified to be displayed.

* * * * *